Jan. 28, 1969     G. DEUTSCHLÄNDER     3,424,293

DEVICE FOR GROUPING OBJECTS

Filed March 20, 1967

United States Patent Office 3,424,293
Patented Jan. 28, 1969

3,424,293
DEVICE FOR GROUPING OBJECTS
Gert Deutschländer, Neuhausen am Rheinfall, Switzerland, assignor to Schweizerische Industrie-Gesellschaft, Neuhausen am Rheinfall, Switzerland
Filed Mar. 20, 1967, Ser. No. 624,307
Claims priority, application Switzerland, Mar. 22, 1966, 4,108/66
U.S. Cl. 198—34                3 Claims
Int. Cl. B65g 47/26

ABSTRACT OF THE DISCLOSURE

A device is disclosed for grouping objects, fed in a continuous succession, into groups of equal numbers, and for passing on the groups uniformly spaced apart.

Background of the invention

The object of the present invention is to provide a device for grouping objects fed in continuous succession into groups of equal number and for passing on the groups uniformly spaced apart which has only a few moving parts and which does not subject the objects to great accelerative forces.

Summary of the invention

A device according to the present invention includes the combination of a first conveyor track adapted to receive and feed the objects, a stop element adapted to intermittently stop the movement of the objects on the first conveyor track, an endless, rotatable element having a part of its periphery extending parallel to the first conveyor track, and a second conveyor track, said rotatable element having members movable into the path of the objects for transferring the objects released by the stop element on to said second conveyor track.

Brief description of the drawings

An embodiment of the subject of the invention is illustrated schematically in the drawings.

Description of the preferred embodiment

Figure 1:
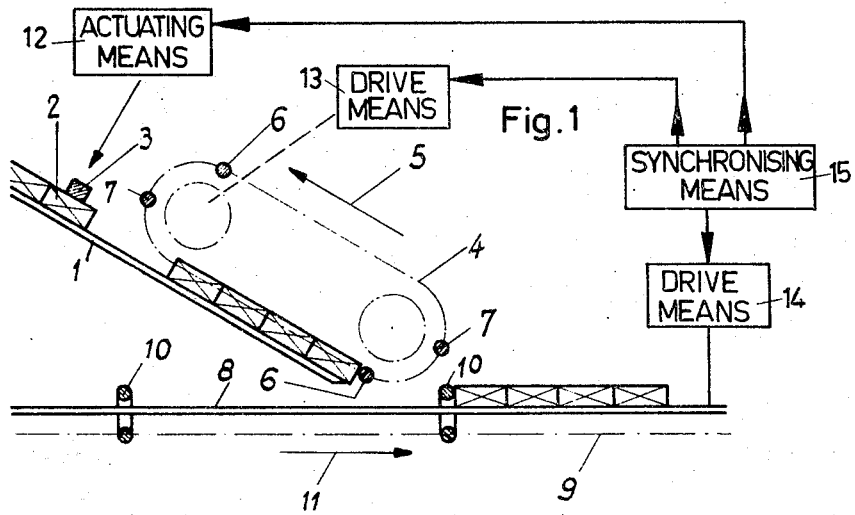
FIGS. 1 to 3 illustrate side elevations of the device in various operating positions.

Objects 2 are moved in a continuous succession downwardly on an inclined conveyor track or chute 1 under the force of gravity. Their movement is periodically interrupted by a presser 3 which under control of actuating means 12 presses one of the objects against the bottom of the conveyor track and thus arrests the entire row of objects. A rotatable element in the form of an endless chain 4 having a part of its periphery extending parallel to the conveyor track 1 is arranged above the conveyor track 1. The chain 4 is continuously moved in the direction of the arrow 5 by drive means 13. Groups of rods 6, 7 are secured to the chain 4 and, during their movement along the part extending parallel to the conveyor track 1, are moved into the path of the objects 2.

A second horizontally disposed stationary conveyor track 8 is arranged beneath the lower end of the conveyor track 1. Parallel to the conveyor track 8 extends an endless chain 9 with drivers 10 which is driven in the direction of the arrow 11 by drive means 14. The drivers 10 are arranged at equal distances apart on the endless chain 9.

The actuating means 12 for the presser 3, the drive means 13 for the chain 4 and the drive means 14 for the chain 9 with the drivers 10 are in driven timed relationship with each other, their movements being coordinated by synchronising means 15.

Figure 2:
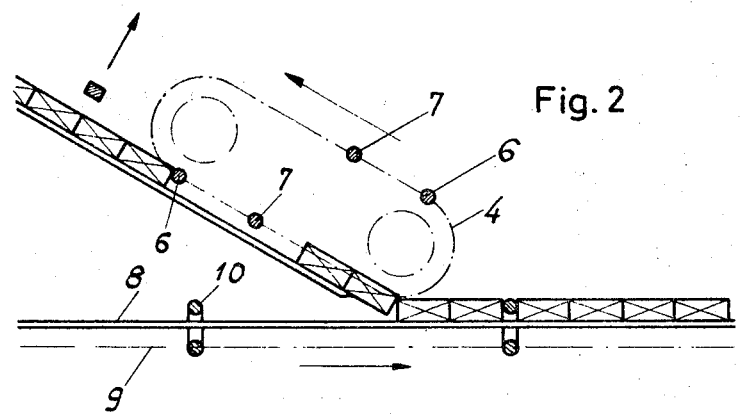
Figure 3:
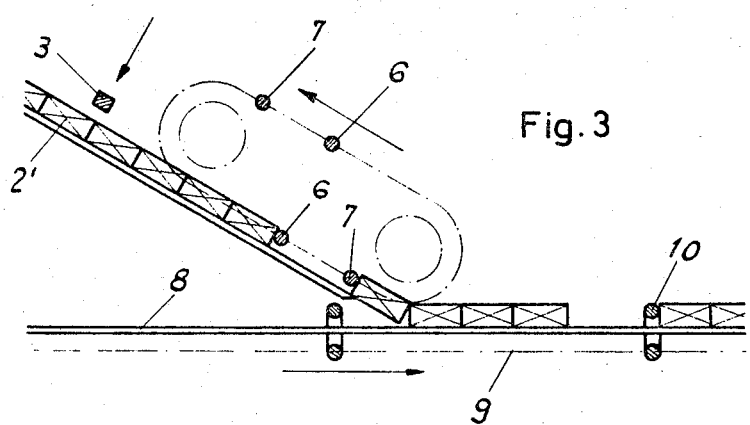

The device operates in the following manner: The presser 3 is raised as soon as a rod 6 of the chain 4 has moved into a position in which it is located in the path of the objects 2. Thus, the objects are released and slide down the track 1 until the foremost object abuts against a rod 6 on the chain 4. The objects 2 now move along at the peripheral speed of the chain 4. This phase is illustrated in FIG. 2. As soon as a predetermined number of objects (four, for example, as illustrated in the drawing) has passed under the presser, the latter is lowered again, so that it arrests the fifth object 2' (see FIG. 3) and thus all the objects therebehind. However, the four objects located in front of the clamped object 2' continue their movement and slide on to the second conveyor track 8. Since the latter is stationary, a portion of the objects of this group still on the track 1 would come to rest. However, one of the rods 7 on the chain 4 now pushes these objects fully on to the track 8. Here, the separate groups of objects are engaged by a driver 10 on the chain 9 and conveyed further. The distances between the rod 6, 7, and between the drivers 10, are adapted to the number of objects to be separated at any given time.

I claim:
1. Device for grouping objects which are moved in a continuous succession into groups of equal numbers, said device comprising in combination an inclined chute along which the objects to be grouped slide downwardly by their gravity, presser means for engaging the next object following the number of objects forming the selected group and stopping its movement by pressing it against the bottom of said inclined chute, a continuously driven endless conveyor extending parallel to the lower portion of said chute and carrying a first transverse member engaging the last object of said selected group of objects which moves away from said arrested object and transferring said group of objects to a stationary horizontal conveyor track arranged below the lower end of said inclined chute, a horizontal continuously driven unless conveyor with driving lugs thereon moving along said horizontal conveyor track with one of said driving lugs engaging said group of objects transferred to said horizontal track and moving said group of objects along said stationary conveyor track, means for releasing said presser means from said arrested object for permitting another group of objects to move downwardly along said chute, and a second transverse member on said continuously driven endless conveyor which extends parallel to said inclined chute, said second transverse member being spaced from said first transverse member and being engaged by the first object of the next group of objects so as to maintain a predetermined distance between the groups of objects which one after the other are transferred to said horizontal conveyor track.
2. Device according to claim 1, including a second pair of said first and second transverse members provided on said continuously driven endless conveyor which extends parallel to said inclined chute.
3. Device according to claim 1, including means for synchronizing the operations of said presser means, said inclined endless conveyor and said horizontal conveyor with said driving lugs thereon.

References Cited
UNITED STATES PATENTS

| 2,756,862 | 7/1956 | Creed | 198—23 X |
| 2,805,755 | 9/1957 | Jones | 198—34 |
| 2,878,919 | 3/1959 | Jones | 198—34 |

EVON C. BLUNK, Primary Examiner.